(12) United States Patent
Bonawitz et al.

(10) Patent No.: US 9,319,905 B2
(45) Date of Patent: Apr. 19, 2016

(54) RE-TASKING BALLOONS IN A BALLOON NETWORK BASED ON EXPECTED FAILURE MODES OF BALLOONS

(71) Applicant: Google Inc., Mountain View, CA (US)

(72) Inventors: Keith Bonawitz, Mountain View, CA (US); Joshua Weaver, Mountain View, CA (US); Richard DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 122 days.

(21) Appl. No.: 14/014,822

(22) Filed: Aug. 30, 2013

(65) Prior Publication Data

US 2015/0063159 A1    Mar. 5, 2015

(51) Int. Cl.
*H04L 12/28* (2006.01)
*H04W 24/04* (2009.01)

(52) U.S. Cl.
CPC ..................... *H04W 24/04* (2013.01)

(58) Field of Classification Search
None
See application file for complete search history.

(56) References Cited

U.S. PATENT DOCUMENTS

| | | | |
|---|---|---|---|
| 4,865,266 A | 9/1989 | George | |
| 5,813,634 A * | 9/1998 | Pizzicaroli et al. | 244/158.4 |
| 6,167,263 A | 12/2000 | Campbell | |
| 6,269,242 B1 * | 7/2001 | Leopold et al. | 455/427 |
| 7,777,674 B1 * | 8/2010 | Haddadin et al. | 342/368 |
| 7,801,522 B2 | 9/2010 | Knoblach et al. | |
| 7,859,653 B2 | 12/2010 | Cisar et al. | |
| 7,913,948 B2 | 3/2011 | Porter | |
| 2002/0167702 A1 | 11/2002 | Badesha et al. | |
| 2003/0095064 A1 * | 5/2003 | Branscombe et al. | 342/354 |
| 2006/0074558 A1 * | 4/2006 | Williamson et al. | 701/213 |
| 2013/0010610 A1 | 1/2013 | Karthikeyan et al. | |
| 2013/0177321 A1 | 7/2013 | DeVaul et al. | |

OTHER PUBLICATIONS

Charles W. Vogt, Jr., Performance Capability of a Damaged Lighter-Than-Air Vehicle Operating in the Near Space Regime, AFIT/GSS/ENY/06-M13, Mar. 2006.
Khare et al., "On Recovery of Lost Targets in a Cluster-based Wireless Sensor Network," In Proceedings of PerCom Workshops, IEEE, Mar. 25 2011, pp. 20-213.
International Search Report and Written Opinion for PCT/US2014/052140 mailed Dec. 1, 2014, 10 pages.

* cited by examiner

*Primary Examiner* — Willie J Daniel, Jr.
(74) *Attorney, Agent, or Firm* — McDonnell Boehnen Hulbert & Berghoff LLP

(57) ABSTRACT

Example methods and systems for assigning tasks to balloons within a balloon network are described. One example system includes a first sub-fleet of balloons assigned a first set of one or more tasks within a balloon network, a second sub-fleet of balloons assigned a second set of one or more tasks within the balloon network, and a control system configured to determine that a first balloon in the first sub-fleet of balloons initially has a predicted failure mode that corresponds to the first set of tasks, subsequently determine that the first balloon has a predicted failure mode that corresponds to the second set of tasks, and reassign the first balloon from the first sub-fleet of balloons to the second sub-fleet of balloons.

26 Claims, 15 Drawing Sheets

RE-TASKING BALLOONS IN A BALLOON NETWORK BASED ON EXPECTED FAILURE MODES OF BALLOONS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Example methods and systems for assigning tasks to balloons within a balloon network are described. An example system may include a first sub-fleet of balloons that is assigned a first set of one or more tasks within the network. The system may also include a second sub-fleet of balloons assigned a second set of one or more tasks. A control system may be configured to determine that a first balloon in the first sub-fleet of balloons initially has a predicted failure mode that corresponds to the first set of tasks. The control system may subsequently determine that the first balloon has a predicted failure mode that corresponds to the second set of tasks. The control system may then reassign the first balloon from the first sub-fleet of balloons to the second sub-fleet of balloons.

In one example, a system is provided that includes a first sub-fleet of balloons assigned a first set of one or more tasks within a balloon network, a second sub-fleet of balloons assigned a second set of one or more tasks within the balloon network, and a control system configured to determine that a first balloon in the first sub-fleet of balloons initially has a predicted failure mode that corresponds to the first set of tasks, subsequently determine that the first balloon has a predicted failure mode that corresponds to the second set of tasks, and reassign the first balloon from the first sub-fleet of balloons to the second sub-fleet of balloons.

In another example, a method is provided that includes determining that a first balloon in a balloon network has a predicted failure mode that corresponds to a first set of tasks, where the balloon network includes at least a first sub-fleet of balloons assigned a first set of one or more tasks and a second sub-fleet of balloons assigned a second set of one or more tasks, subsequently determining that the first balloon has a predicted failure mode that corresponds to the second set of tasks, and reassigning the first balloon from the first sub-fleet of balloons to the second sub-fleet of balloons.

In still another example, a system is provided that includes a plurality of sub-fleets of balloons, where each sub-fleet of balloons is assigned a corresponding set of one or more tasks within a balloon network and where each balloon in one of the sub-fleets of balloons initially has a predicted failure mode that corresponds to the set of tasks assigned to the sub-fleet of balloons, and a control system configured to periodically determine that a particular balloon in a first sub-fleet of balloons has a predicted failure mode that corresponds to a set of tasks assigned to a second sub-fleet of balloons and reassign the particular balloon from the first sub-fleet of balloons to the second sub-fleet of balloons.

In yet another example, a system may include means for determining that a first balloon in a balloon network has a predicted failure mode that corresponds to a first set of tasks, where the balloon network includes at least a first sub-fleet of balloons assigned a first set of one or more tasks and a second sub-fleet of balloons assigned a second set of one or more tasks, means for subsequently determining that the first balloon has a predicted failure mode that corresponds to the second set of tasks, and means for reassigning the first balloon from the first sub-fleet of balloons to the second sub-fleet of balloons.

These as well as other aspects, advantages, and alternatives, will become apparent to those of ordinary skill in the art by reading the following detailed description, with reference where appropriate to the accompanying figures.

DETAILED DESCRIPTION

I. Overview

Figure 1:
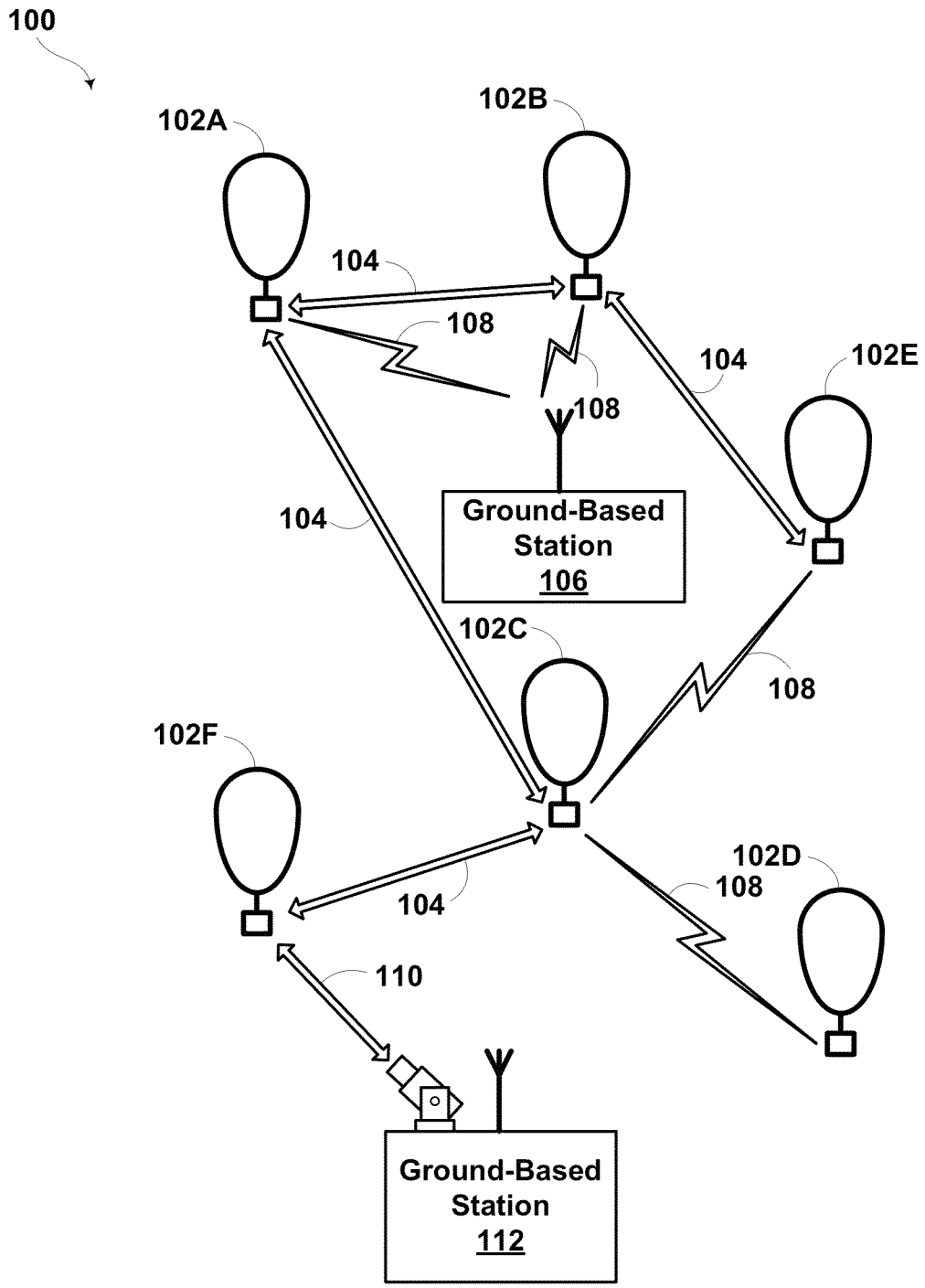
FIG. 1 is a block diagram illustrating an example balloon network.

Examples of methods and systems are described herein. It should be understood that the words "example" and "exemplary" are used herein to mean "serving as an example, instance, or illustration." Any embodiment or feature described herein as "exemplary" is not necessarily to be construed as preferred or advantageous over other embodiments or features. The example or exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Examples herein may be configured to help provide control of a data network that includes a plurality of balloons, for example, configured as a mesh network formed by high-altitude balloons deployed in the stratosphere. In some examples, the network of balloons may be divided into multiple sub-fleets of balloons. Each sub-fleet of balloons may be given different tasks within the network. For instance, one sub-fleet of balloons may provide local service to ground-based stations, another sub-fleet of balloons may serve as relay nodes between balloons, while another sub-fleet of balloons may be sent to provide service on long-distance flight paths, and so on. Additionally, each sub-fleet of balloons may be operated according to a separate set of constraints.

In further examples, a control system may assign individual balloons to sub-fleets. Additionally, balloons may be assigned to multiple different sub-fleets during their lifetimes. For instance, a balloon may be placed in a sub-fleet that allows the balloon to execute long-distance flight paths during a first period of the balloon's life. The balloon may then be reassigned to a second sub-fleet where the balloon may serve as a relay node between other network balloons during a second stage of the balloon's life. The balloon may be reassigned again to a third sub-fleet at a later point in time, where the balloon may serve as a weather balloon that collects data for weather forecasting. Other example balloon life stages exist as well.

In some examples, a control system may assign individual balloons to sub-fleets based on predicted failure modes of the individual balloons. A predicted failure mode of a balloon may indicate how and when the balloon may be expected to fail. More specifically, a failure mode of a balloon may indicate a certain type of failure of an individual balloon component. For instance, components that may fail may include balloon envelopes, communication systems, propelling systems, power systems, sensor systems, or other mechanical or electrical systems. Some failure modes may render the balloon entirely non-functional, while other failure modes may only make the balloon unusable for certain purposes. For instance, a balloon envelope may experience a small hole that may lead to a slow loss of pressure but the balloon may still be functional for some time, or the balloon may experience a rip in the envelope that may cause rapid balloon descent.

The control system may use predicted failure modes of individual balloons to determine what tasks may be most appropriate for a balloon to handle within the network. For example, if it is determined that a specific component of a balloon may be likely to fail soon, the balloon may be re-tasked to carry out different functions that don't require the component. For instance, it may be determined that a balloon that is carrying out tasks that require the balloon to spend time at high altitudes is likely to experience a failure in its envelope. Accordingly, the balloon may be reassigned to handle less demanding tasks. As another example, it may be determined that a balloon that is serving as a relay balloon may likely experience a failure in its communication systems with other balloons. The balloon may be reassigned to serve as a weather balloon, which may not require the same amount of balloon-to-balloon communication. The control system may execute other types of reassignments based on predicted failure modes as well.

Additionally, the predicted failure modes of individual balloons may also be used to position balloons or sub-fleets of balloons in particular locations. For instance, if it is determined that an envelope of an individual balloon is likely to fail soon, the balloon may be assigned to a sub-fleet of balloons that stays close to a particular ground-based station. Accordingly, the balloon may be recovered easily if it does fail as predicted. Furthermore, a sub-fleet containing balloons that may be likely to fail soon may be controlled so that individual failing balloons don't cross commercial flight lanes, land on populated areas, or land in areas where the balloons may be difficult to recover.

In additional examples, predicted failure modes of individual balloons may include more complex metrics. For instance, a predicted failure mode may include separate times-to-failure of multiple different components or types of failure. In further examples, a failure of a certain component or a certain type of failure that is likely to occur at the earliest point in time may be determined. Additionally, a probability distribution of times-to-failure, or a failure rate curve, may be determined for entire balloons or balloon components as well or instead.

In some examples, balloons and/or balloon components may experience a high likelihood of failure during an initial period shortly after the balloon is launched. After surviving this initial period, the likelihood of failure may drop substantially for a long period of time until the likelihood of failure slowly starts to increase as the balloon gets older. An example control system may take advantage of such failure rate curves. For instance, balloons may be assigned to a first sub-fleet during an initial period where the balloon undergoes one or more stress tests. The first sub-fleet may not perform any functions vital to the network to minimize the harm done if the balloon fails. After surviving the initial period, the balloon may then be reassigned to a second sub-fleet. Because the balloon may be unlikely to fail at that point, the balloon may be given more important tasks within the second sub-fleet.

Example methods therefore may allow control systems to assign tasks to individual balloons operating within a balloon network. Balloons may be divided into sub-fleets based on predicted failure modes of the balloons, among other things. The sub-fleets may each carry out different tasks that are coordinated to facilitate functioning of the balloon network.

II. Example Balloon Networks

In order that the balloons can provide a reliable data network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations.

Further, in an exemplary balloon network, the balloons may communicate with one another using free-space optical communications. For instance, the balloons may be configured for optical communications using ultrabright LEDs or possibly lasers for optical signaling (although regulations for laser communications may restrict laser usage). In addition, the balloons may communicate with ground-based station(s) using radio-frequency (RF) communications.

In some embodiments, a high-altitude-balloon network may be homogenous. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. (Note also that some balloons may be configured to function as both a super-node and a sub-node.)

In such a configuration, the super-node balloons may be configured to communicate with nearby super-node balloons via free-space optical links. However, the sub-node balloons may not be configured for free-space optical communication, and may instead be configured for, e.g., RF communications. Accordingly, a super-node may be further configured to communicate with nearby sub-nodes using RF communications. The sub-nodes may accordingly relay communications from the super-nodes to ground-based station(s) using RF communications. Configured as such, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102E, which are configured to communicate with one another via free-space optical links 104. Configured as such, balloons 102A to 102E may collectively function as a mesh network for packet-data communications. Further, balloons 102A to 102D may be configured for RF communications with ground-based stations 106 via RF links 108.

In an exemplary embodiment, balloons 102A to 102E are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102E may generally be configured to operate at altitudes between 17 km and 22 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 22 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 22 km.

To transmit data to another balloon, a given balloon 102A to 102E may be configured to transmit an optical signal via an optical link 104. In an exemplary embodiment, a given balloon 102A to 102E may use one or more high-power light-emitting diodes (LEDs) to transmit an optical signal. Alternatively, some or all of balloons 102A to 102E may include laser systems for free-space optical communications over optical links 104. Other types of free-space optical communication are possible. Further, In order to receive an optical signal from another balloon via an optical link 104, a given balloon 102A to 102E may include one or more optical receivers. Additional details of balloons implementations are discussed in greater detail below, with reference to FIG. 3.

In a further aspect, balloons 102A to 102D may utilize one or more of various different RF air-interface protocols for communication ground-based stations 106 via RF links 108. For instance, some or all of balloons 102A to 102D may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an exemplary network may also include downlink balloons, which provide a high-capacity air-to-ground link.

For example, in balloon network 100, balloon 102E is configured as a downlink balloon. Like other balloons in an exemplary network, a downlink balloon 102E may be operable for optical communication with other balloons via optical links 104. However, a downlink balloon 102E may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102E may additionally be operable for RF communication with ground-based stations 106. In other cases, a downlink balloon 102E may only use an optical link for balloon-to-ground communications. Further, while the arrangement shown in FIG. 1 includes just one downlink balloon 102E, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of or in addition to a free-space optical communication system. The high-bandwidth RF communication system may take the form of an ultra-wideband system, which provides an RF link with substantially the same capacity as the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102E over an RF link 108. As such, a ground-based station 106 may be configured as an access points via which various devices can connect to balloon network 100. Ground-based stations 106 may have other configurations and/or serve other purposes without departing from the scope of the invention.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102E may collectively function as a mesh network. More specifically, since balloons 102A to 102E may communicate with one another using free-space optical links, the balloons may collectively function as a free-space optical mesh network.

In a mesh-network configuration, each balloon 102A to 102E may function as a node of the mesh network, which is operable to receive data direct to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

Further, in order to operate as a mesh network, balloons 102A to 102E may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102E move relative to one another and/or relative to the ground. Accordingly, an exemplary balloon network 100 may apply a mesh protocol to update the state of the network as the topology of the network changes. For example, to address the mobility of the balloons 102A to 102E, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102E may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for improving QoS may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102E maintaining and/or moving into a certain position relative to one or more other balloons in the network (and possibly in a certain position relative to the ground). As part of this process, each balloon 102A to 102E may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such case, a given balloon 102A to 102E may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be dynamic and adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Further, in some embodiments, balloons may be in continuous or nearly continuous motion, and station-keeping may involve moving balloons so as to try to meet certain requirements for e.g., coverage in various areas.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
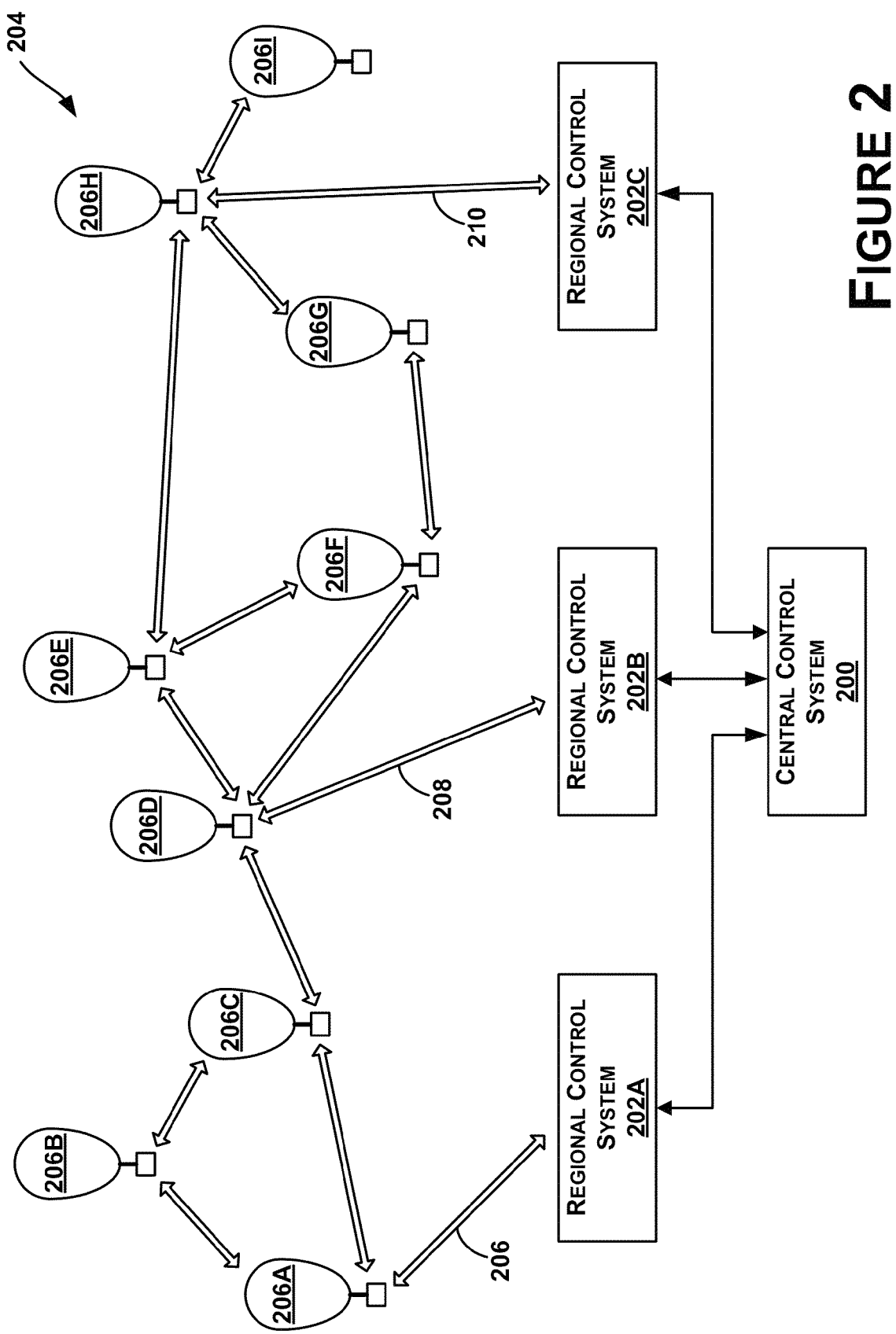
FIG. 2 is a block diagram illustrating an example balloon-network control system.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, where only some of balloons 206A to 206I are configured as downlink balloons, the balloons 206A, 206D, and 206H that are configured as downlink balloons may function to relay communications from central control system 200 to other balloons in the balloon network, such as balloons 206B, 206C, 206E to 206G, and 206I. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202B may in fact just be particular type of ground-based station that is configured to communicate with downlink balloons (e.g., such as ground-based station 112 of FIG. 1). Thus, while not shown in FIG. 2, the control system shown in FIG. 2 may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

As noted, FIG. 2 shows a distributed-control arrangement, with regional control systems 202A to 202C coordinating communications between a central control system 200 and a balloon network 204. Such an arrangement may be useful in a balloon network that covers a large geographic area. In some embodiments, a distributed control system may even support a global balloon network that provides coverage everywhere on earth. Of course, a distributed-control arrangement may be useful in other scenarios as well.

Further, it should be understood that other control-system arrangements are possible. For instance, some implementations may involve a distributed control system with additional layers (e.g., sub-region systems within the regional control systems, and so on). Alternatively, control functions may be provided by a single, centralized, control system, which communicates directly with one or more downlink balloons.

In a further aspect, control and coordination of a balloon network may be shared between a ground-based control system and a balloon network to varying degrees, depending upon the implementation. In fact, in some embodiments, there may be no ground-based control system. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

D. Illustrative Balloon Configurations

Figure 3:
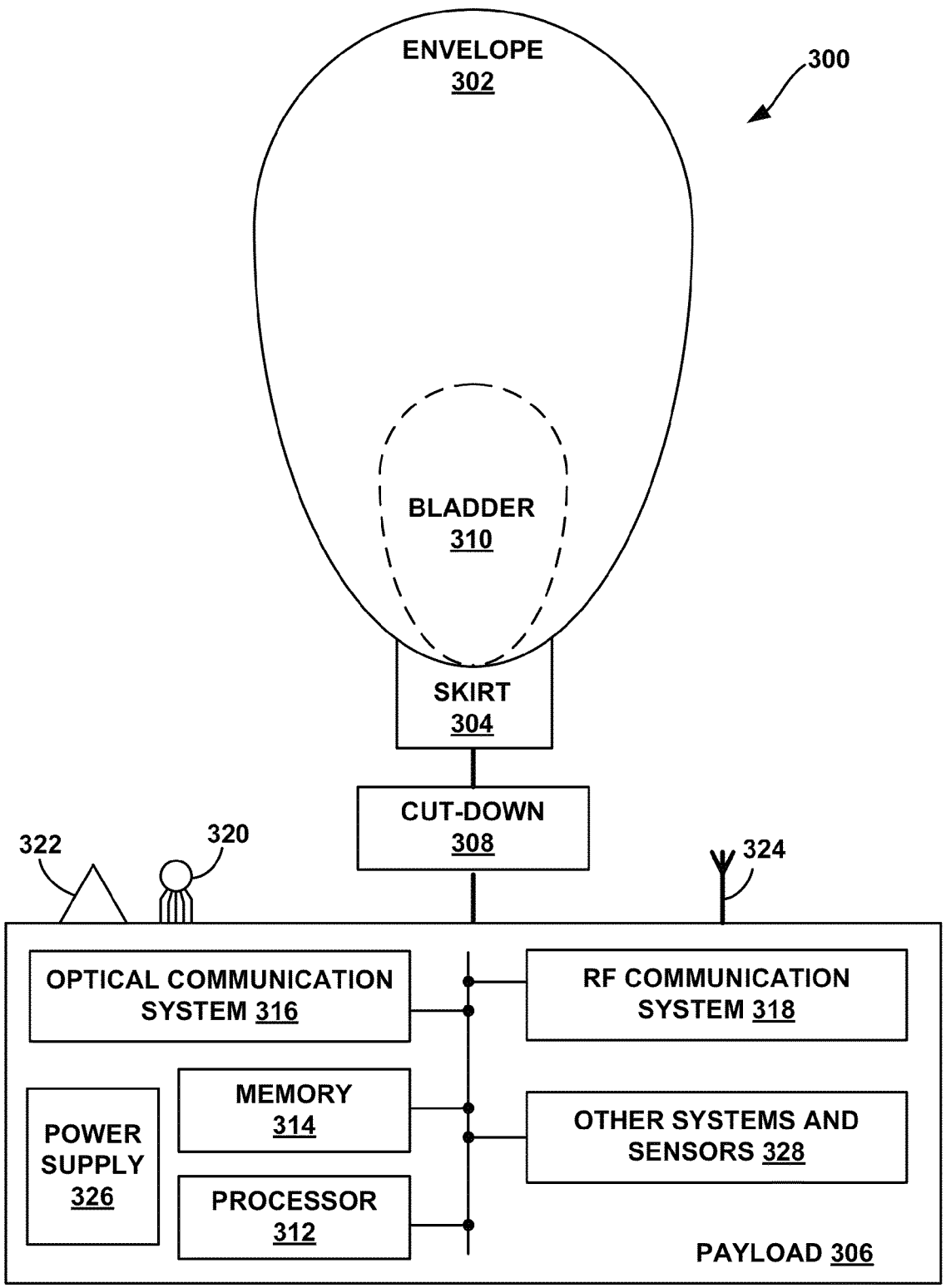
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 17 km and 22 km. FIG. 3 is a simplified block diagram illustrating a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 324. The payload 306 may also include a power supply 326 to supply power to the various components of balloon 300.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow air to escape from bladder 310.

Further, the balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Note that movement and locations of balloons, such as balloon 300, can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able to find winds that will carry the balloon horizontally (e.g., latitudinally and/or longitudinally) to a desired horizontal location. Wind speed and/or direction may vary with altitude, and since current wind velocities as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

E. Example Heterogeneous Network

In some embodiments, a high-altitude-balloon network may include super-node balloons, which communicate with one another via optical links, as well as sub-node balloons, which communicate with super-node balloons via RF links. Generally, the optical links between super-node balloons have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
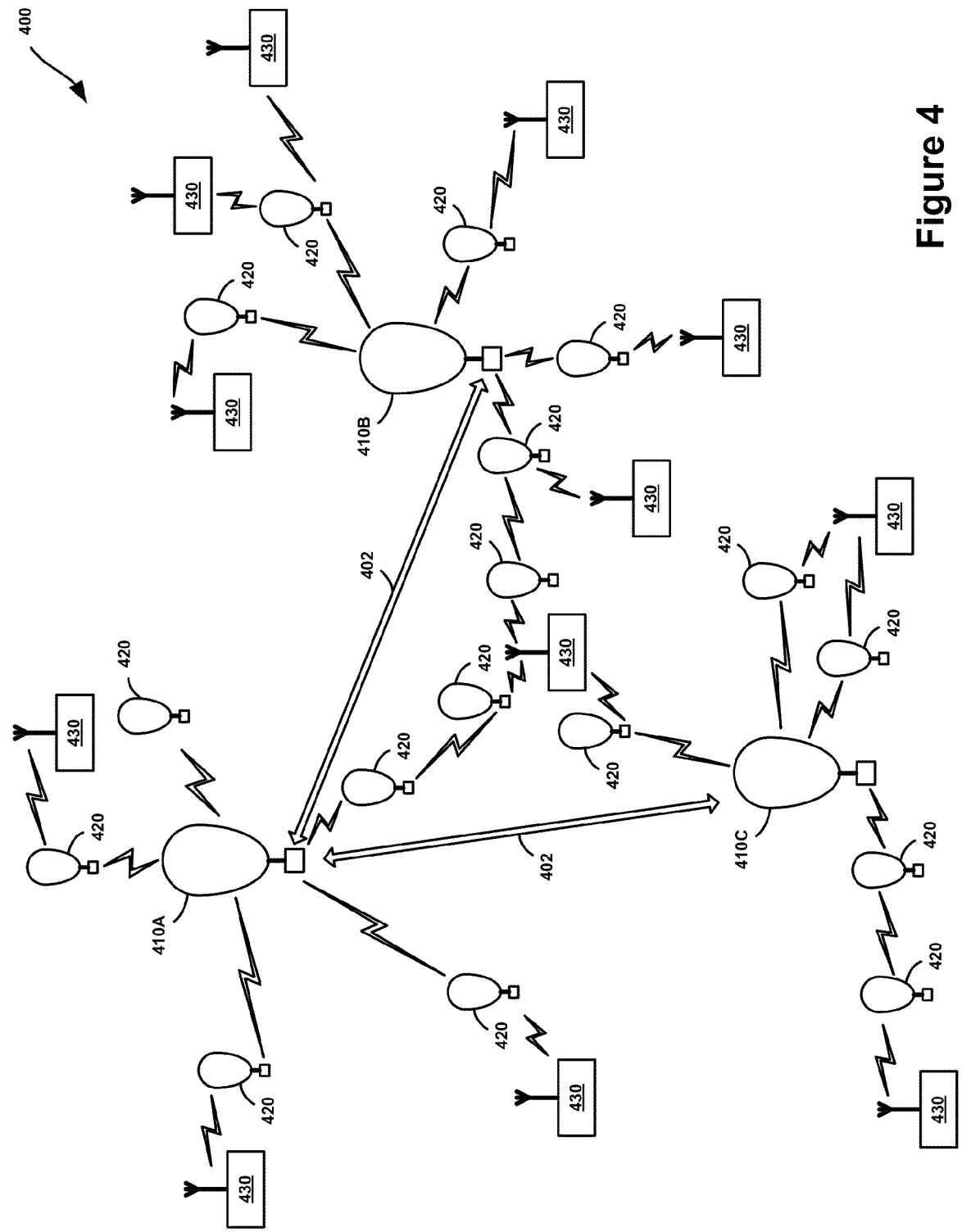
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more.

Configured as such, the super-nodes 410A to 410C may be capable of optical communications at speeds of 10 to 50 GB/sec.

A larger number of balloons may then be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to balloon network 400.

III. Example Methods

Figure 5:
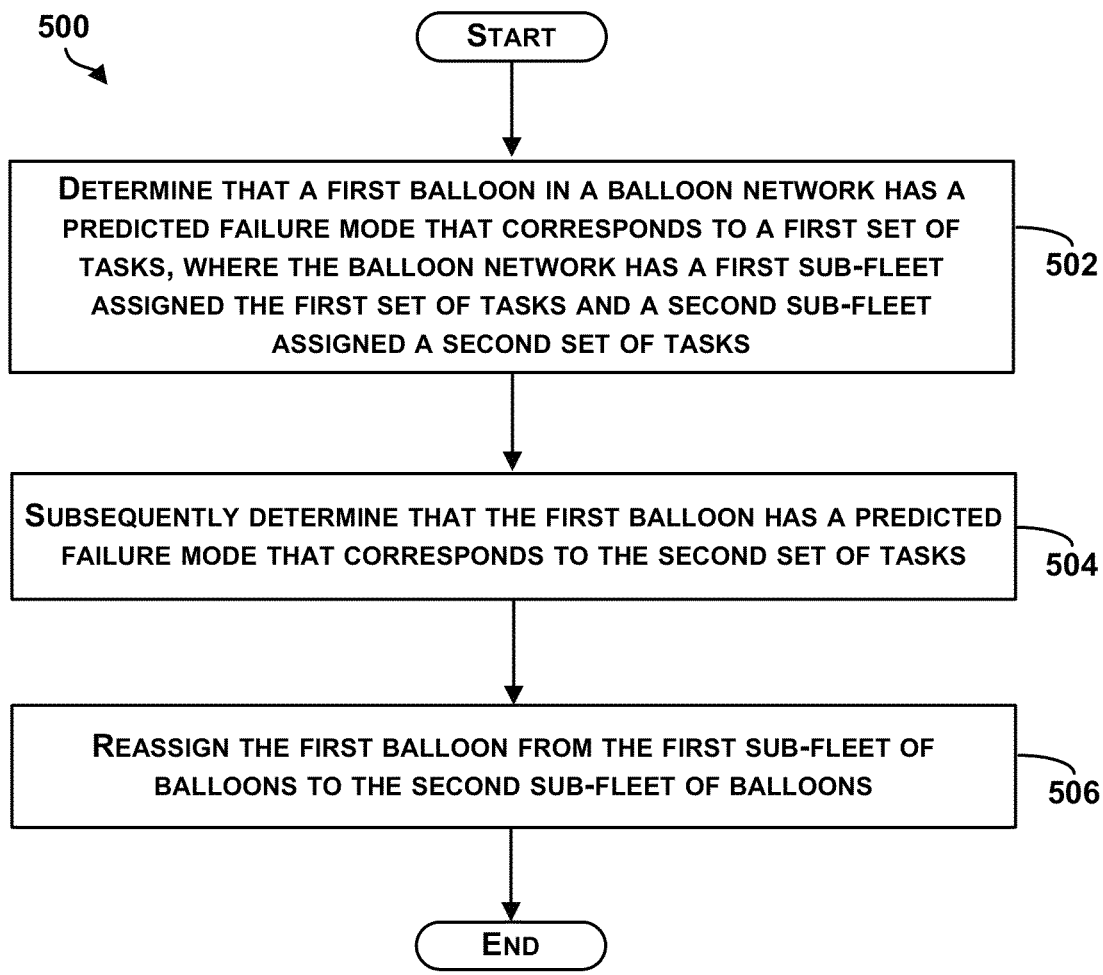
FIG. 5 is a block diagram of a method, according to an example embodiment.

FIG. 5 is a block diagram of a method, according to an example embodiment. The method 500 may be carried out by a control system of a balloon network. For example, some or all of method 500 may be carried out by a central control system and/or regional systems such as the ones described above with respect to FIG. 2. The control system(s) may communicate with the balloons within the balloon network. In further examples, all or some of method 500 may be carried out by one or more computing systems located on the individual balloons. In some examples, the parts of the method 500 may be combined, separated into additional parts, and/or carried out in a different order than shown. Other configurations are also possible.

More specifically, the method 500 may involve determining that a first balloon in a balloon network has a predicted failure mode that corresponds to a first set of tasks, as shown by block 502. The balloon network may have a first sub-fleet of balloons assigned the first set of tasks and a second sub-fleet of balloons assigned a second set of tasks. The method 500 may further involve subsequently determining that the first balloon has a predicted failure mode that corresponds to the second set of tasks, as shown by block 504. The method 500 may further involve reassigning the first balloon from the first sub-fleet of balloons to the second sub-fleet of balloons, as shown by block 506.

A balloon network may have a first sub-fleet of balloons assigned a first set of tasks and a second sub-fleet of balloons assigned a second set of tasks. A sub-fleet of balloons may be a group of balloons operating according to a certain set of constraints within the balloon network. The constraints may be used to position individual balloons within a sub-fleet and/or assign tasks to individual balloons. Certain constraints may be applied to multiple sub-fleets (or every sub-fleet) while other constraints may be used only for one specific sub-fleet. Additionally, in some examples, different sub-fleets may contain balloons of different types, which may have different shapes, sizes, equipment, etc.

Furthermore, each sub-fleet may be assigned a particular set of tasks that facilitate functioning of the network as a whole. For instance, a sub-fleet of balloons may be assigned to provide local service to a ground-based station. The balloons in the sub-fleet may communicate with one or more ground-based stations using RF communications. In some examples, the balloons in the sub-fleet may be positioned around a single station. In other examples, the balloons may be controlled to move between stations and provide service to multiple stations. The balloons may also send and receive information to and/or from balloons from other sub-fleets, and then use their RF communication systems to route the data to and/or from ground-based stations.

In another example, a sub-fleet of balloons may be assigned to serve as relay balloons between balloons from other sub-fleets. For instance, the balloons may be assigned to relay information to and from other balloons using free-space optical communication systems. Balloons within the sub-fleet may be positioned so that large gaps within the network may be avoided. Accordingly, the sub-fleet may facilitate communication between distant groups of balloons by serving as relay nodes within the network.

In a further example, a sub-fleet of balloons may be assigned to execute long-distance flight paths. A network of balloons may benefit from having certain balloons that can travel long distances to provide service to particular locations. For instance, an event drawing a large crowd may require additional balloons to provide the needed amount of coverage. Balloons from a sub-fleet of balloons assigned to cover long distances can be sent to the location to provide the needed services.

In another example, a sub-fleet of balloons may be assigned to collect data for weather forecasting. Balloons can be positioned where weather data is needed (e.g., for planning flight paths of other balloons). Sensors on the balloons may be used to collect data about current weather conditions. The balloons may then transmit the data to the rest of the network, for instance by sending the data to relay balloons or to balloons that can transmit the data to ground-based stations.

Figure 6A:
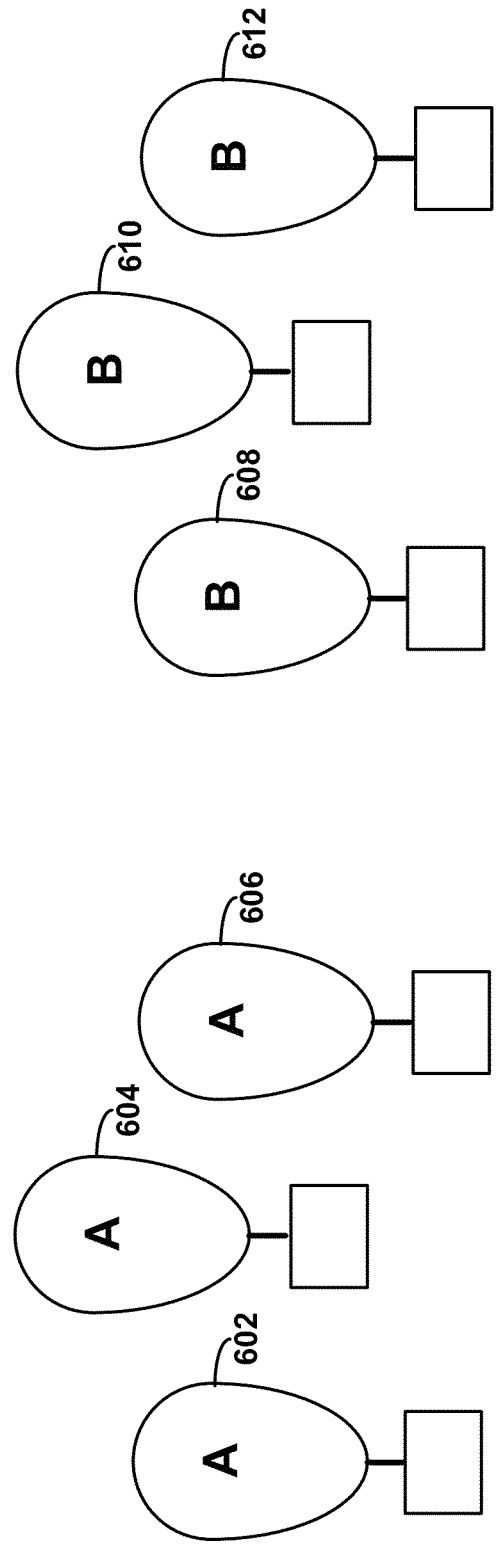
FIG. 6A illustrates two sub-fleets of balloons within a balloon network, according to an example embodiment.

FIG. 6A shows two sub-fleets of balloons, according to an example embodiment. Balloons 602, 604, 606 may be part of a first sub-fleet, sub-fleet A, which may be assigned a first set of tasks. Balloons 608, 610, 612 may be part of a second sub-fleet, sub-fleet B, which may be assigned a second set of tasks. Each sub-fleet may be assigned or more of the tasks described above, as well as other types of tasks not explicitly described above.

Method 500 may involve determining that a first balloon in a balloon network has a predicted failure mode that corresponds to the first set of tasks that is assigned to the first sub-fleet, as shown by block 502. A predicted failure mode may indicate how and when a balloon is expected to fail. A predicted failure mode may correspond with a set of tasks if a balloon may be able to perform some or all of the tasks even if the predicted mode of failure occurs. In other examples, a predicted failure mode may correspond with a set of tasks if the set of tasks contains the most appropriate task or tasks for the balloon to perform within the network after factoring in the balloon's predicted mode of failure.

For instance, a balloon may have a predicted failure mode indicating that the balloon's RF communication systems used to communicate with ground-based stations may be likely to fail. This predicted failure mode may correspond with a set of tasks assigned to a particular sub-fleet of balloons—for instance, a sub-fleet that serves as relay nodes between other balloons. The free-space optical communication systems of a balloon that are used to communicate with other balloons may not be affected by a failure of the balloon's RF communication systems. Accordingly, a balloon with this predicted failure mode may be able to perform tasks assigned to the sub-fleet of relay balloons even if the balloon fails as expected.

In some examples, a predicted failure mode may include an expected failure of a particular balloon component. For instance, it may be determined that the balloon may be likely to experience a failure in an envelope, a communication system, a propelling system, a power system, a sensor system and/or another mechanical or electrical system. Additionally, a predicted failure mode may include a time-to-failure of an individual component and/or of the entire balloon.

In other examples, a predicted failure mode may include a specific type of failure of a given component. For instance, some types of failures may be instantly catastrophic, such as when a balloon envelope bursts. Other types of failures may be slow-acting, taking days or months or years to progress to complete failure. For instance, a balloon may experience a small leak, but may still be able to operate within the network for a significant period of time.

Many other examples of different types of failures of balloon components exist as well. In some examples, certain balloon systems, such as a balloon's sensor systems, may only partially fail. For instance, a balloon may lose certain weather sensors (such as thermometers or barometers) while retaining other weather sensors (such as moisture sensors or wind gauges). In such an example, a predicted failure mode may include partial failures. In other examples, a predicted failure mode may be a type of failure that is likely to occur at the earliest point in time from a group of multiple different types of failure.

In further examples, partial failures may include intermittent failures or balloons with reduced capability. For instance, a balloon experiencing a partial failure may generate less solar power, have less power storage available in batteries, have less vertical range available, need more power for maneuvers, have lower communications bitrates, or take longer to establish optical communications links. Some example systems may differentiate between fully-capable balloons, slightly impaired balloons, highly impaired balloons, and so on. In additional examples, a failure mode may indicate a failure relative to some threshold level. For instance, a failure mode may incorporate balloons failing to generate X watts of solar power for one or more chosen values of X.

Method 500 may further involve subsequently determining that the first balloon has a predicted failure mode that corresponds to a second set of tasks that is assigned to the second sub-fleet, as shown by block 504. For instance, a balloon may develop a new predicted failure mode after functioning in a certain role for a period of time. Systems or components of the balloon that have been used heavily may become more likely to fail over time. Predictions about likely failure modes can be made based on data received by active sensors located on a balloon and/or based on failures of similar balloons or balloons that carried out similar tasks, among other factors. Based on the new predicted failure mode, a new set of tasks may be more appropriate for the balloon to perform.

Figure 6B:
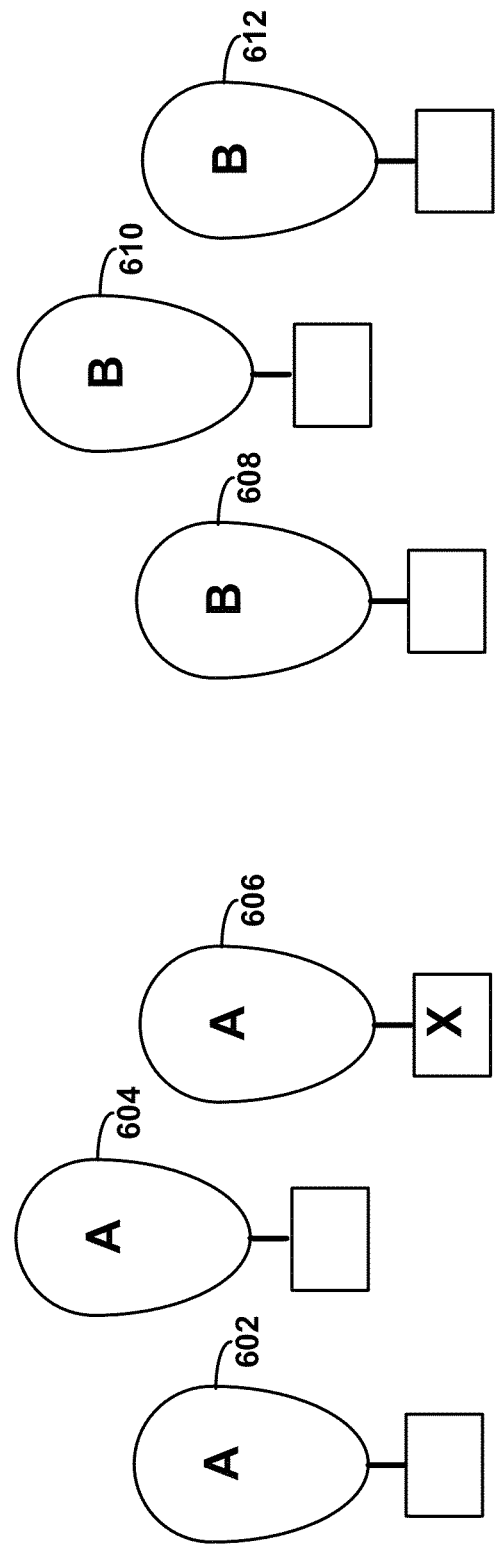
FIG. 6B illustrates a predicted failure mode of a balloon within one of the sub-fleets of balloons from FIG. 6A, according to an example embodiment.

FIG. 6B shows a predicted failure mode, according to an example embodiment. As an example, balloon 606 of sub-fleet A may develop a predicted failure mode indicating that the balloon's free-space optical communication systems used for communication with other balloons may be likely to fail soon. Balloons in sub-fleet A may be assigned to serve as relay nodes between other balloons. Accordingly, balloons in sub-fleet A may rely heavily on their free-space optical communication systems to communicate with other balloons. The predicted failure mode of balloon 606 may now correspond with a set of tasks that doesn't require heavy use of the free-space optical communication systems. For instance, balloon 606 may be more appropriately placed in sub-fleet B, which may be assigned to collect data for weather forecasting. Even if some of balloon 606's communication systems fail, the balloon may still have functioning sensors that can collect the needed weather data. Accordingly, the tasks assigned to sub-fleet B may now be more appropriate for balloon 606 to fulfill within the network.

Method 500 may further involve reassigning the first balloon from the first sub-fleet of balloons to the second sub-fleet of balloons, as shown by block 506. After determining that a particular balloon may be better suited to perform tasks assigned to a different sub-fleet, the balloon may be reassigned to maximize its utility within the network. The decision to reassign a balloon may come from a control system, which may be a central control system or a localized control system as described above, and in either case, could be implemented in one or more ground-based stations, one or more balloons, or a combination of one or more ground-based stations and one or more balloons.

Figure 6C:
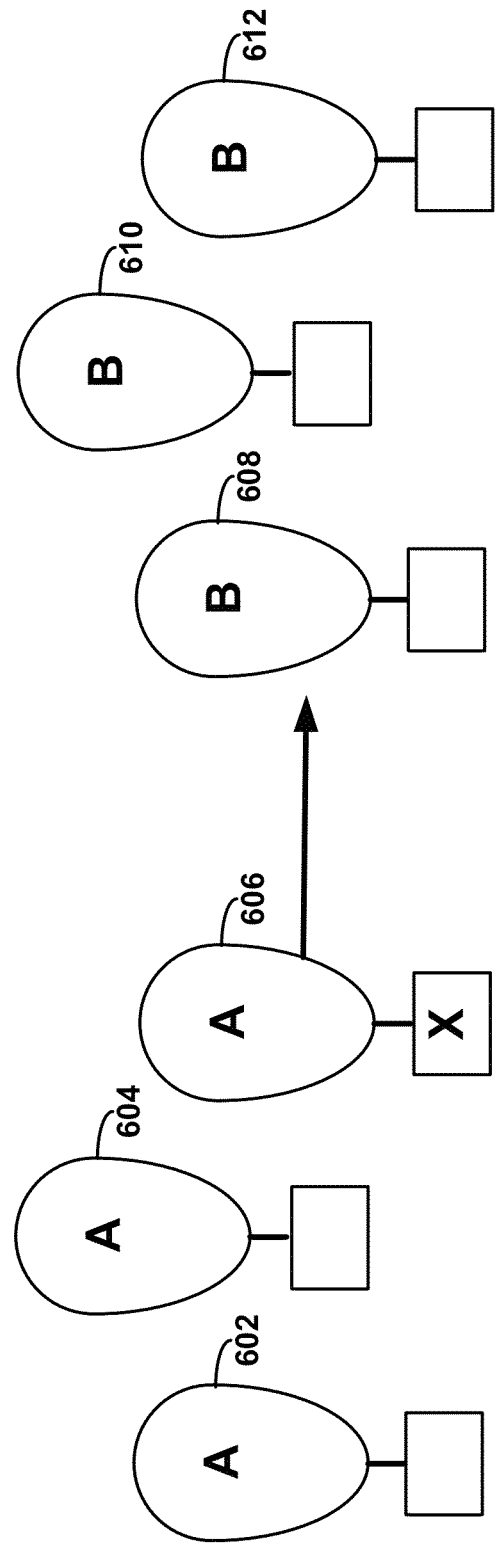
FIG. 6C illustrates reassignment of a balloon within one of the sub-fleets of balloons from FIG. 6A, according to an example embodiment.
Figure 6D:
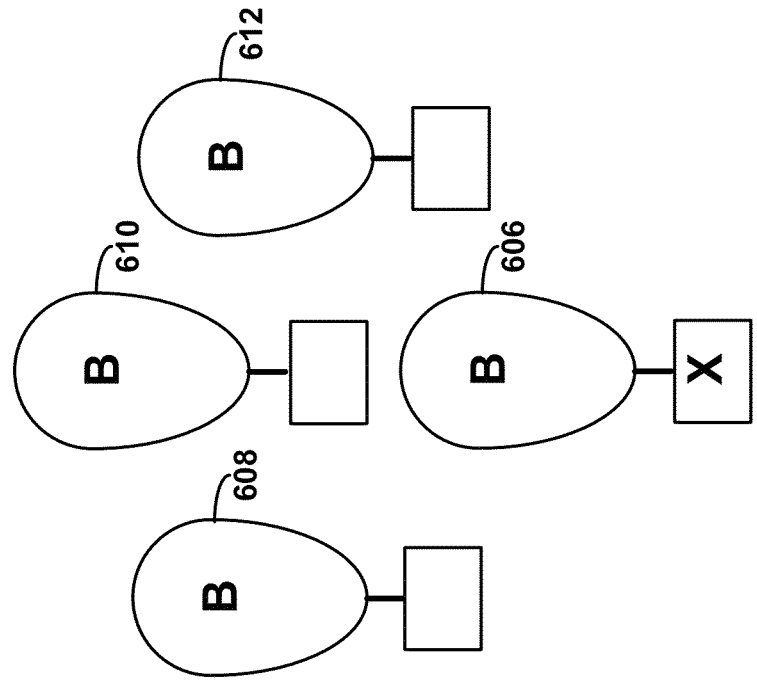
FIG. 6D illustrates the sub-fleets of balloons following the reassignment of FIG. 6C, according to an example embodiment.
Figure 6D:
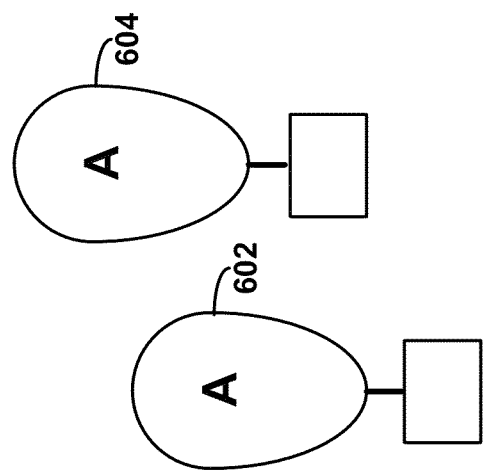

FIG. 6C shows the reassignment of a balloon, according to an example embodiment. After determining that the predicted failure mode of balloon 606 corresponds better with the set of tasks assigned to sub-fleet B, the balloon 606 may be reassigned from sub-fleet A to sub-fleet B. FIG. 6D shows the sub-fleets following the reassignment of balloon 606. The balloon 606 may now carry out the tasks assigned to sub-fleet B, which may provide more utility to the network given the balloon's predicted failure mode.

In some examples, a control system may periodically move balloons between multiple sub-fleets of balloons based on a predicted failure modes of individual balloons and/or based on other factors. The control system may balance the distribution of balloons across different sub-fleets over time to facilitate functioning of the entire network and to maximize the utility of individual balloons. For instance, the control system may periodically determine that a certain sub-fleet does not have enough balloons to carry out its tasks. For example, the sub-fleet may have lost some balloons due to failure and/or the demand for the tasks assigned to the sub-fleet may have increased. The control system may then reassign additional balloons to the sub-fleet.

In additional examples, a priority level associated with each set of tasks may be determined. For instance, some tasks may be more vital to the functioning of the overall network than other tasks. The control system may take into account the priority level associated with tasks carried out by different sub-fleets when assigning balloons. For example, the control system may first ensure that sub-fleets carrying out higher priority tasks have enough balloons with sufficient capabilities first. Once the higher priority tasks are covered, the control system may then assign balloons to sub-fleets carrying out lower priority tasks to the extent that the network has enough balloons to fulfill the lower priority tasks as well.

Figure 7A:
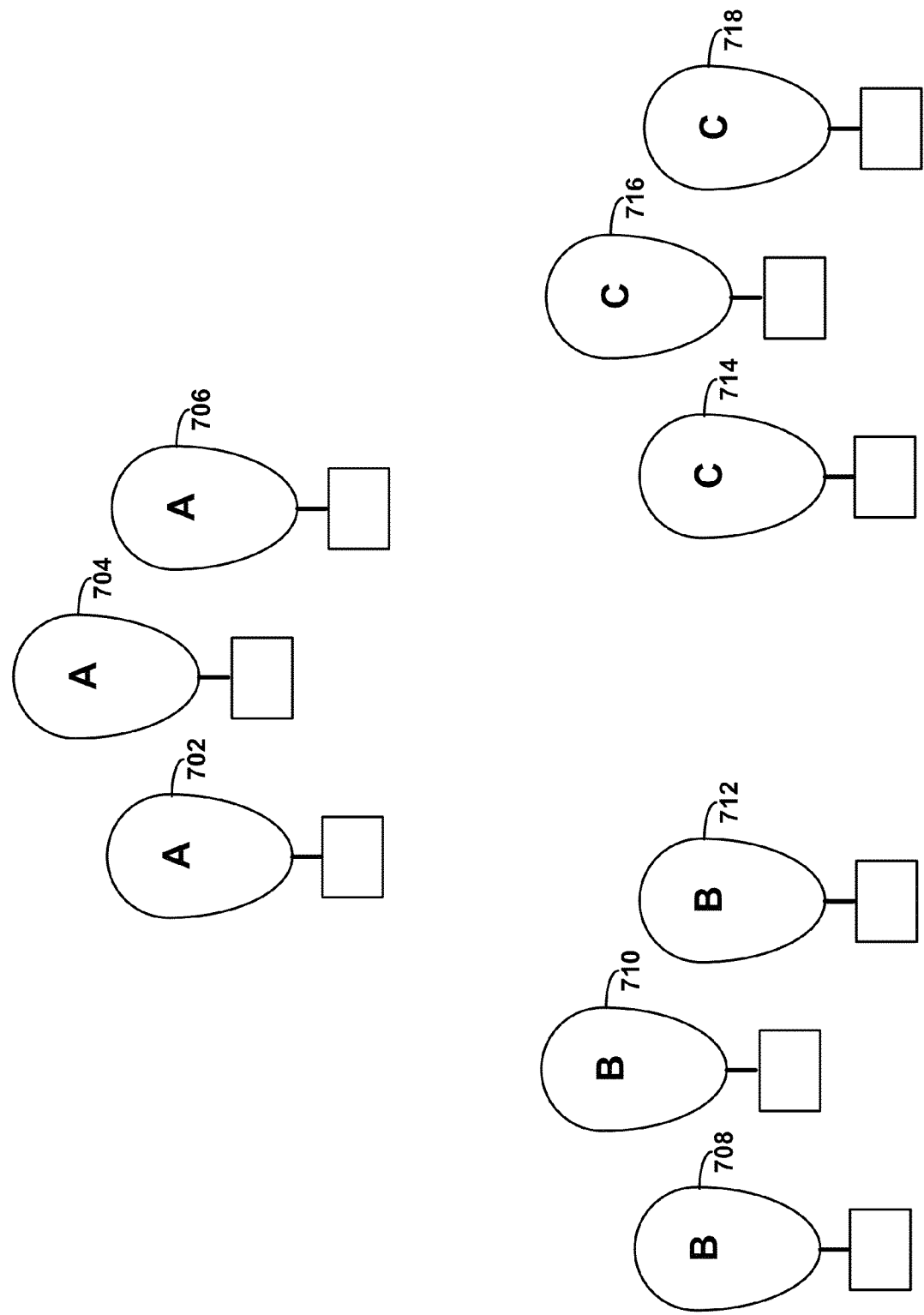
FIG. 7A illustrates three sub-fleets of balloons within a balloon network, according to an example embodiment.

FIG. 7A illustrates three sub-fleets of balloons within a balloon network, according to an example embodiment. A first sub-fleet, sub-fleet A, may contain balloons 702, 704, and 706. Sub-fleet A may be assigned tasks that tend to cause wear and tear to balloon envelopes, such as spending significant time at high altitudes. A second sub-fleet, sub-fleet B, may contain balloons 708, 710, and 712. Sub-fleet B may be assigned tasks that rely heavily on the balloons' free-space optical communication systems, such as serving as relay nodes between other balloons within the network. A third sub-fleet, sub-fleet C, may contain balloons 714, 716, and 718. Sub-fleet C may be assigned tasks that tend to make extensive use of the balloons' propelling systems, such as carrying out long-distance flight paths.

Figure 7B:
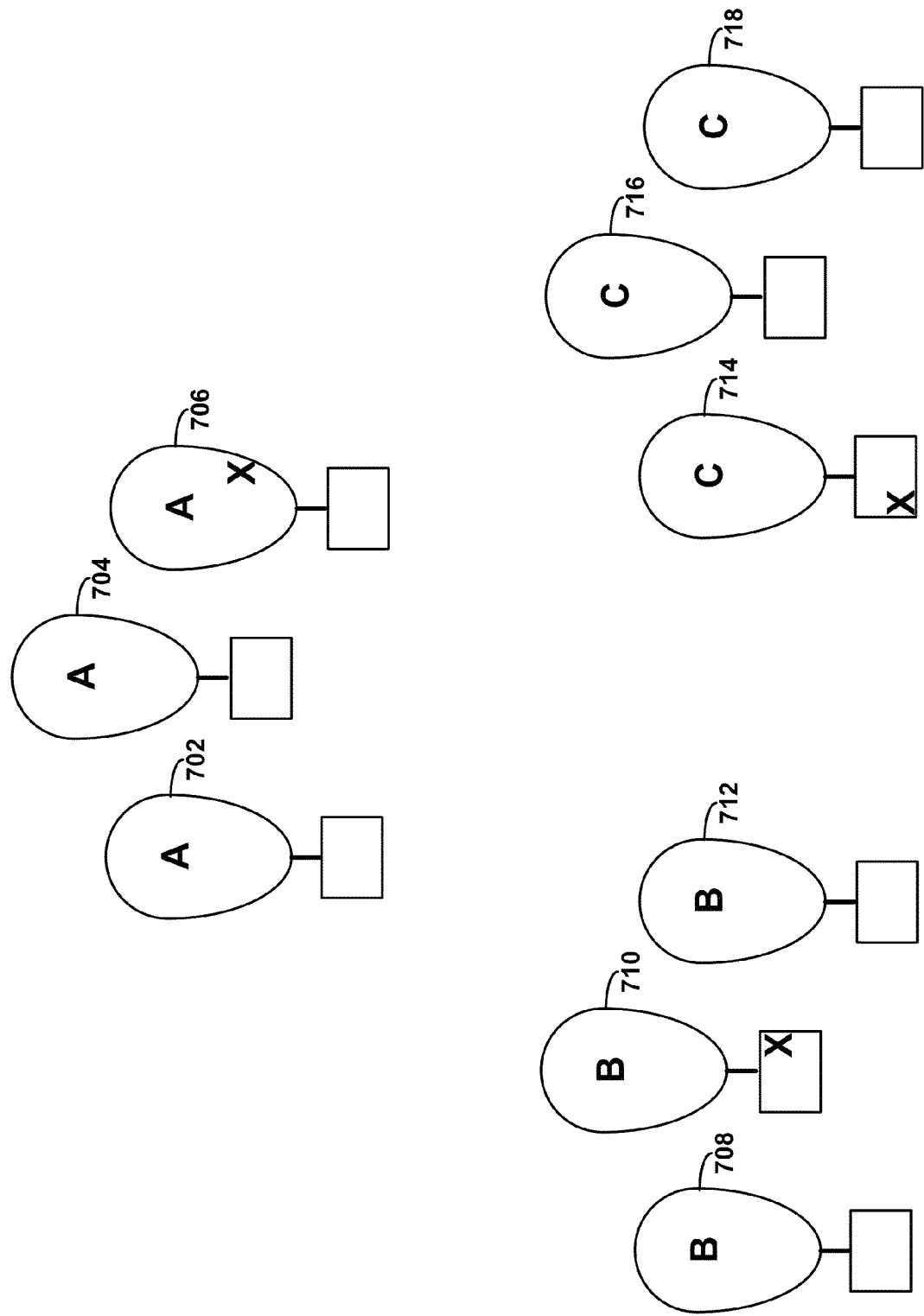
FIG. 7B illustrates predicted failure modes of balloons within the sub-fleets of balloons of FIG. 7A, according to an example embodiment.

A control system may periodically determine predicted failure modes of individual balloons within one or more of the sub-fleets of balloons. FIG. 7B shows predicted failure modes of individual balloons, according to an example embodiment. Balloon 706, a balloon from sub-fleet A, may have a predicted failure mode indicating that the envelope of balloon 706 may be likely to fail soon. For instance, strain sensors located on the balloon may detect significant deformity in the material of the balloon envelope. As another example, the prediction may be based on past failures of similar balloons. For instance, it may be determined that balloon envelopes may be likely to fail after spending a certain amount of time at high altitudes. Predictions could be based on a combination of factors as well.

Additionally, as shown in FIG. 7B, balloon 710, a balloon from sub-fleet B, may have a predicted failure mode indicating that balloon 710's free-space optical communication systems may be likely to fail soon. For instance, balloon 710 may have made extensive use of its balloon-to-balloon communication systems while serving as a relay node within sub-fleet B. Based on the history of the balloon's activities and/or diagnostic systems located on the balloon, it may be determined that a failure of the balloon's communication systems may be imminent.

Furthermore, as shown in FIG. 7B, balloon 714, a balloon from sub-fleet C, may have a predicted failure mode indicating that balloon 714's propelling systems may be likely to experience a failure. Balloon 714 may have relied heavily on its propelling systems while carrying out numerous long-distance flight paths as part of sub-fleet C. Consequently, a prediction may be made that if balloon 714 continues to execute long-distance flight paths, the balloon's propelling systems may be likely to fail in the near future.

Figure 7C:
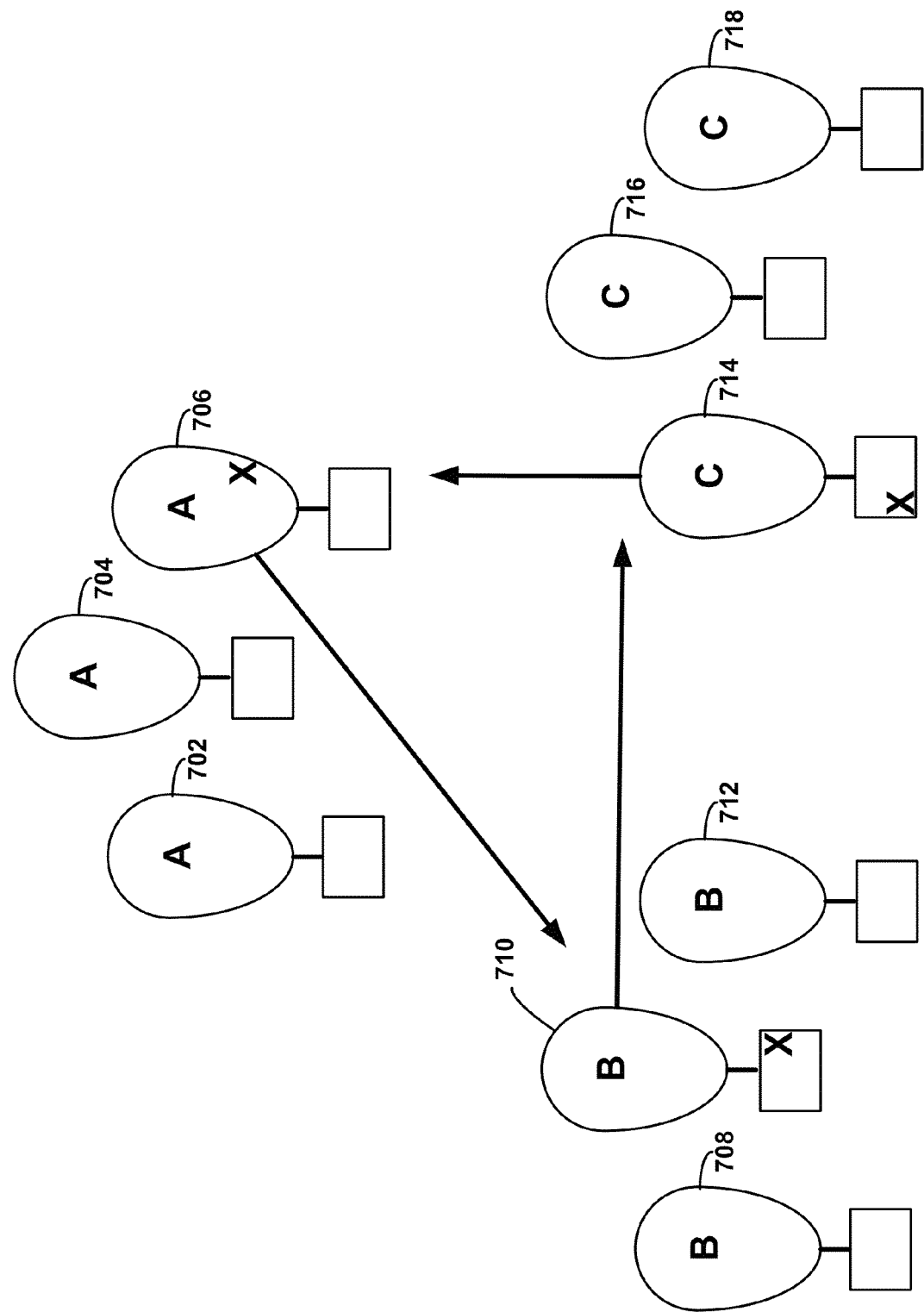
FIG. 7C illustrates reassignment of balloons within the sub-fleets of balloons of FIG. 7A, according to an example embodiment.

After determining predicted failure modes of one or more balloons, a control system may reassign balloons between sub-fleets. FIG. 7C shows the reassignment of three balloons, according to an example embodiment. Balloon 706 from sub-fleet A may have a predicted failure mode indicating that the balloon's envelope may be likely to fail. It may be determined that balloon 706 is better suited to tasks that don't cause heavy stress to balloon envelopes. Consequently, balloon 706 may be reassigned to sub-fleet B, which may be assigned to serve as relay nodes within the balloon network. By serving as a relay node, balloon 706's envelope may be preserved, possibly extending the useful functioning of balloon 706 within the network.

Additionally, balloon 710 from sub-fleet B may have a predicted failure mode indicating that one or more of the balloon's communications systems may be likely to fail. If balloon 710 continues to serve as a relay node within sub-fleet B, it may be determined that a failure of the balloon's communication systems may be likely. Balloon 710 may be more appropriately placed in a sub-fleet that doesn't rely as extensively on a balloon's communication systems. Therefore, balloon 710 may be reassigned to sub-fleet C, which may be assigned to carry out long-distance flight paths.

Furthermore, balloon 714 from sub-fleet C may have a predicted failure mode indicating that one or more of the balloon's propelling systems may be likely to fail. Balloon 714 may no longer be able to carry out long-distance flight paths within sub-fleet C. Consequently, balloon 714 may be reassigned to sub-fleet A, which may be assigned tasks that are less demanding on a balloon's propelling systems.

Figure 7D:
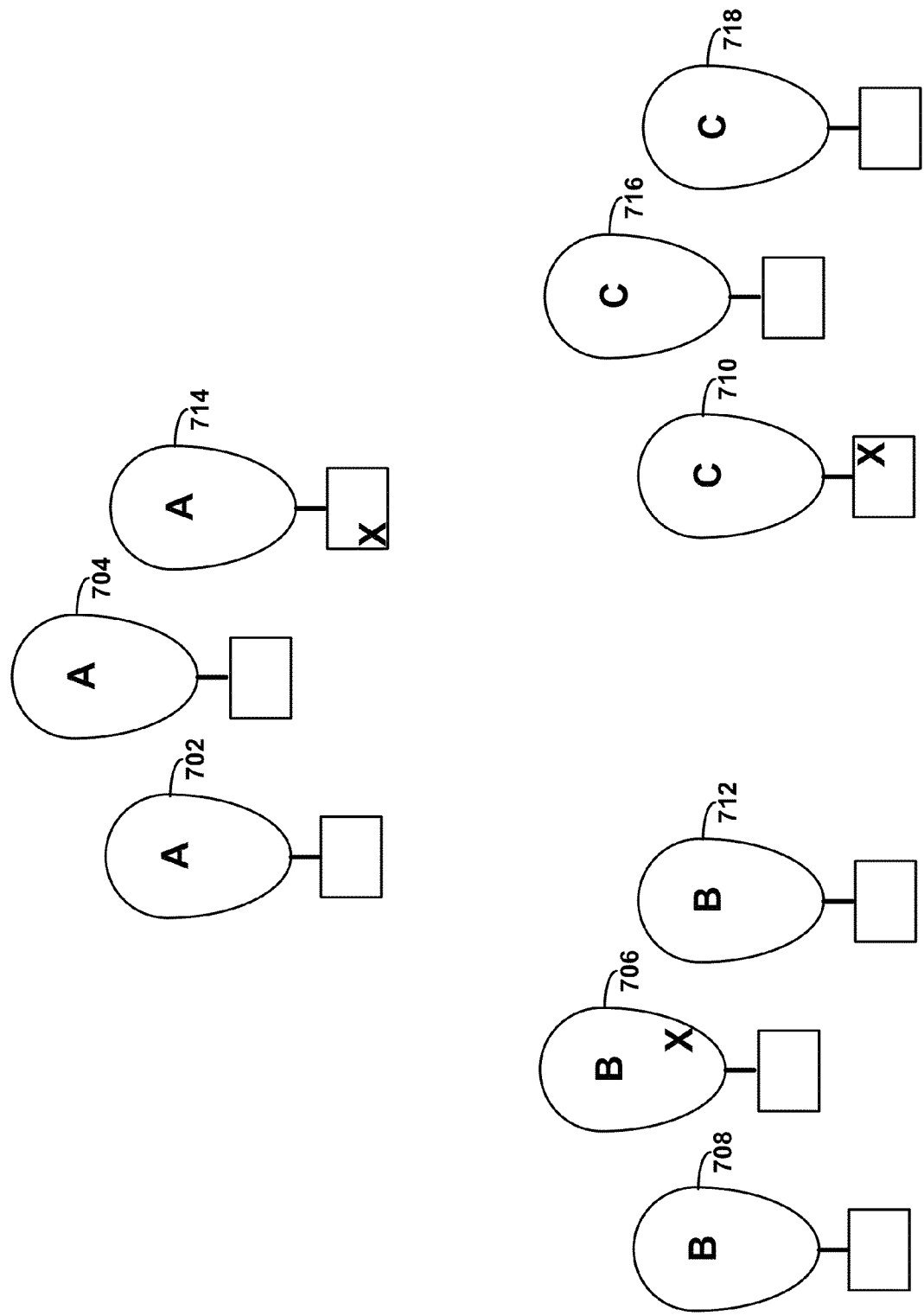
FIG. 7D illustrates the sub-fleets of balloons following the reassignment of FIG. 7C, according to an example embodiment.

FIG. 7D shows the three sub-fleets of balloons following the reassignments of FIG. 7C, according to an example embodiment. As shown, balloon 706 has been reassigned from sub-fleet A to sub-fleet B, balloon 710 has been reassigned from sub-fleet B to sub-fleet C, and balloon 714 has been reassigned from sub-fleet C to sub-fleet A. Accordingly, the network may be able to maximize the utility of each balloon and in some cases, extend the functioning life of individual balloons by leveraging predictions about balloon failures. Additionally, in some examples, some or all of the balloons may go through life stages and may be assigned different tasks in each life stage.

In other examples, balloons may be reassigned to sub-fleets that operate in different regions based on predicted failure modes. For instance, balloons that can no longer generate solar power as rapidly or efficiently may be assigned to sub-fleets that allow the balloons to work in regions with more sunlight. In another example, if a balloon's thermal regulation system is impaired, the balloon may be assigned to work in warmer regions and/or the balloon may be assigned lower-power tasks, leaving more power for heating. In yet another example, a balloon with a partially failing battery that can no longer store as much power may be assigned to daytime work with only low-power work at night (i.e., avoiding high speed communication or altitude control maneuvers at night).

Figure 8:
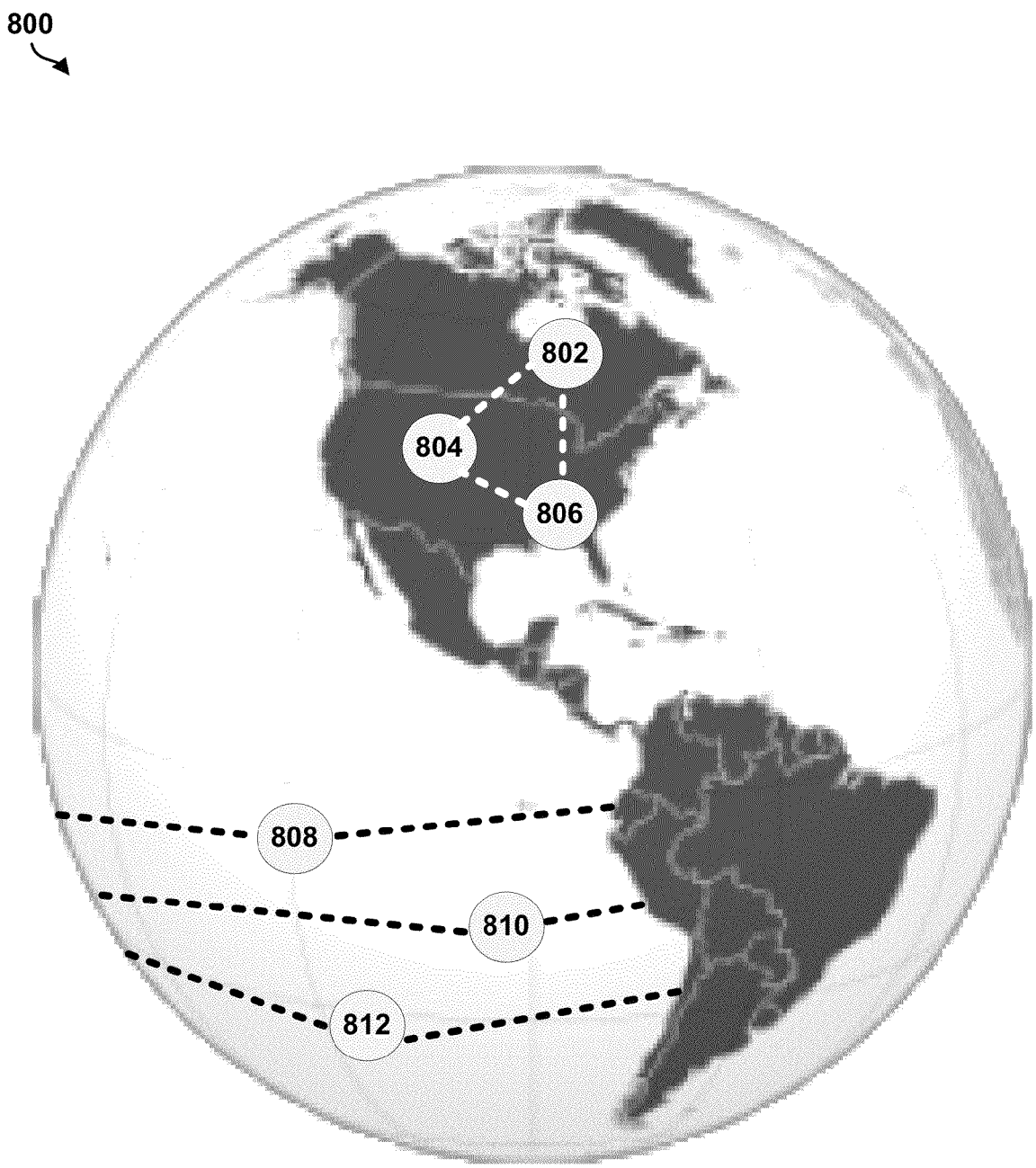
FIG. 8 shows flight paths of two different sub-fleets of balloons, according to an example embodiment.

In some examples, sub-fleets may be assigned to carry out different length flight paths based on predicted failure modes. FIG. 8 shows flight paths of two different sub-fleets of balloons, according to an example embodiment. A first sub-fleet of balloons may contain balloons 802, 804, and 806. The dotted lines represent the flight paths of the balloons. As shown, the first sub-fleet may stay within a certain section of one or more countries. A second sub-fleet may contain balloons 808, 810, 812. As shown by the dotted lines, the second sub-fleet may be assigned to carry out longer flight paths, such as paths across an ocean between continents. As balloons develop predicted failure modes over time, they may be reassigned to sub-fleets that carry out less demanding flight paths. For instance, balloons may be moved from the second sub-fleet of balloons to the first sub-fleet balloons over time.

In additional examples, systems and methods may be used to facilitate balloon recovery when predicted failure modes indicate likely failures of entire balloons. For instance, it may be determined that an individual balloon is likely to experience an imminent total failure, such as a rip in the balloon envelope. Accordingly, the balloon may be moved to a sub-flight that may be assigned to an area where the balloon can easily be recovered. For example, the balloon may be rerouted to avoid bodies of water or countries where balloon recovery may be difficult. Further, the balloon may be repositioned to avoid landing on populated locations or to avoid crossing commercial flight lanes. The balloon may also be moved to a location close to a ground-based station so that data can be quickly offloaded from the failing balloon, and so on.

Figure 9:
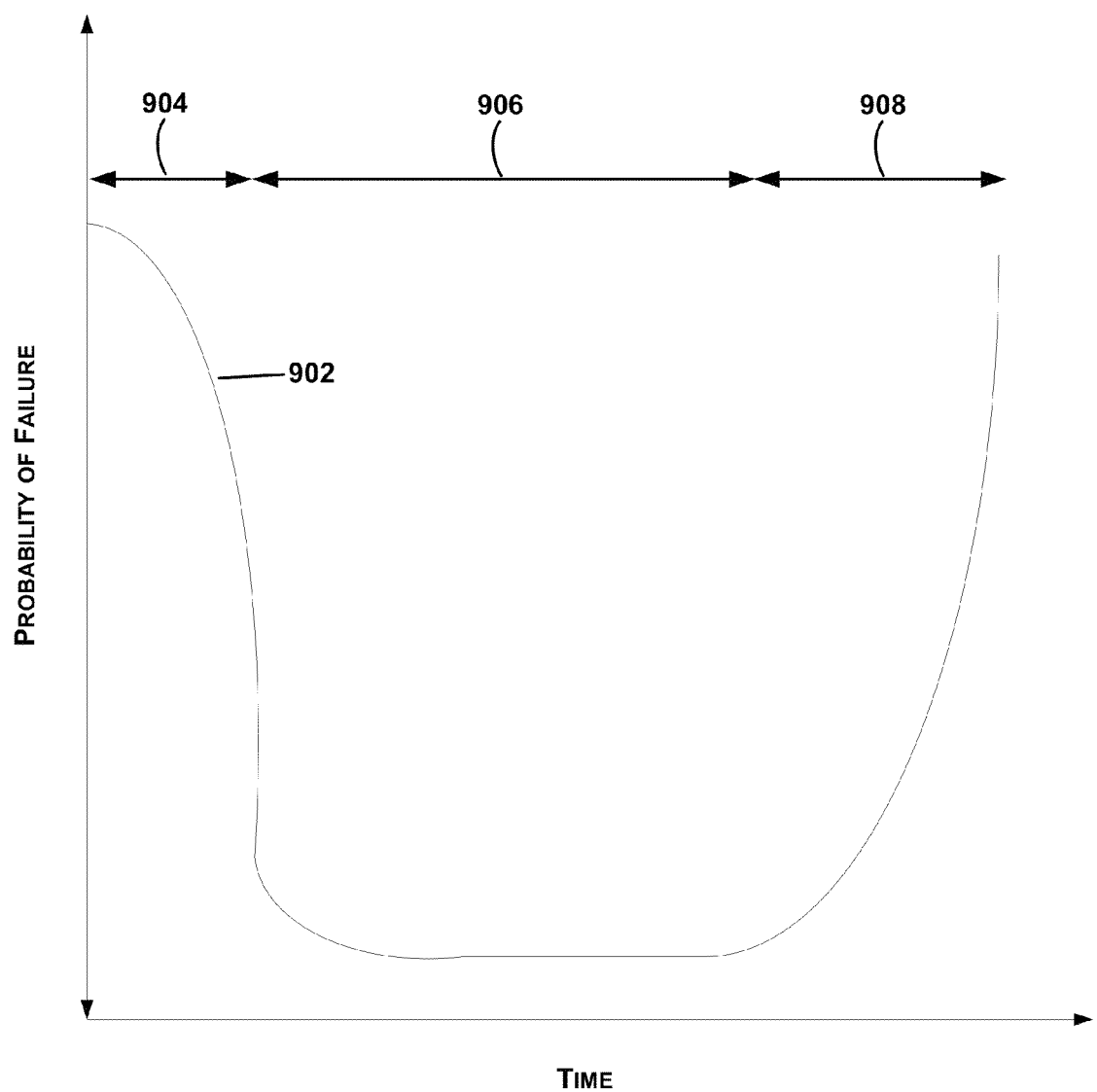
FIG. 9 illustrates a failure rate curve, according to an example embodiment.

In additional examples, a predicted failure mode of a balloon may include a probability distribution of failures, or a failure rate curve. FIG. 9 shows a failure rate curve 902, according to an example embodiment. As shown, a particular balloon component or the entire balloon may be likely to fail very early during a first period 904 of a balloon's lifetime. However, if the component or balloon survives the initial period 904, the probability of failure may drop to a low level during a second period 906 of the balloon's lifetime. The probability of failure may then begin to rise during a third period 908 much later in the balloon's lifetime as the balloon gets older. Accordingly, a predicted failure mode may include probabilities of failures at different times, or other metrics. Furthermore, a failure rate curve 902 may be determined for individual balloon components, entire balloons, or particular types of failures, for example.

In further examples, a control system may use a failure rate curve like the one in FIG. 9 to assign particular balloons to sub-fleets. For instance, if a balloon is likely to have a high rate of failure early in its lifetime, the balloon may first be placed in a sub-fleet that is assigned tasks that are not vital to the functioning of the network as a whole. If the balloon survives the initial period where the risk of failure is high, the balloon may then be reassigned to a sub-fleet that carries out more important functions. In some examples, balloons may first be assigned to a sub-fleet that exposes the balloons to one or more stress tests. The stress tests may be designed to uncover flaws in a balloon's construction that may lead to early balloon failure. If the balloon survives the stress tests, the balloon may then be reassigned to a different sub-fleet to carry out tasks within the network. A control system may leverage failure rate curves of individual balloons and/or balloon components in other ways as well.

In further examples, predictions about balloons failures and reassignment decisions may be improved over time as more information about past balloons becomes available. In some examples, a computing system may apply a machine-learning process to improve associations between certain predicted failure modes and corresponding tasks within the network. In addition to the general techniques discussed herein, the computing device may apply any of a number of well-known machine learning processes such as an artificial neural network (ANN), SVM (Support Vector Machines), Genetic Algorithms, Bayesian inference, Bayes Nets, a Reinforcement Learning method, regression analysis, or a Decision Tree, for instance. After performing such a machine-learning process, a computing system may then be able to conclude that certain correlations between predicted failure modes and assigned tasks are inaccurate or could be more accurate, and then update the predictions and/or assignments accordingly.

It should be understood that the simplified examples given here are not meant to be limiting. In practice, control systems may use the disclosed systems and methods to predict a wide variety of types of possible failures, and assign balloons to a number of different tasks accordingly. Additionally, the systems and methods described herein may be used to assign tasks to balloons based on predicted balloon failures in a variety of different types of network of balloons.

IV. Conclusion

Further, the above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A system comprising:
a first sub-fleet of balloons, wherein the first sub-fleet of balloons is assigned a first set of one or more tasks within a balloon network;
a second sub-fleet of balloons, wherein the second sub-fleet of balloons is assigned a second set of one or more tasks within the balloon network; and
a control system configured to:
determine at a first time that a first balloon has a first predicted failure mode that corresponds to the first set of tasks;
based on determining that the first balloon has the first predicted failure mode that corresponds to the first set of tasks, assign the first balloon to the first sub-fleet of balloons;
determine at a later second time that the first balloon has a second predicted failure mode that corresponds to the second set of tasks, wherein the second predicted failure mode comprises a different type of predicted balloon failure than the first predicted failure mode;
determine that the second predicted failure mode is more likely to occur earlier than the first predicted failure mode; and
in response to determining that the second predicted failure mode is more likely to occur earlier than the first predicted failure mode, reassign the first balloon from the first sub-fleet of balloons to the second sub-fleet of balloons.

2. The system of claim 1, wherein the first sub-fleet of balloons operates according to a first set of constraints; and wherein the second sub-fleet of balloons operates according to a second set of constraints.

3. The system of claim 1, wherein a predicted failure mode of a balloon comprises a probability distribution of expected failure of the balloon over time.

4. The system of claim 1, wherein the first balloon is reassigned from the first sub-fleet of balloons to the second sub-fleet of balloons after an initial time period during which the first balloon is exposed to one or more stress tests.

5. The system of claim 1, wherein one of the sub-fleets of balloons is assigned to communicate with one or more ground-based stations.

6. The system of claim 1, wherein one of the sub-fleets of balloons is assigned to serve as relay balloons between other balloons within the network.

7. The system of claim 1, wherein one of the sub-fleets of balloons is assigned to assist in weather forecasting.

8. The system of claim 1, wherein one of the sub-fleets of balloons is assigned to travel along long-distance flight paths.

9. The system of claim 1, wherein the first predicted failure mode comprises a partial failure of a balloon system.

10. The system of claim 1, wherein the first predicted failure mode comprises a predicted failure of a first balloon component, wherein the second predicted failure mode comprises a predicted failure mode of a second balloon component, wherein the second balloon component is different than the first balloon component, and wherein the first balloon is reassigned from the first sub-fleet of balloons to the second sub-fleet of balloons to reduce usage of the second balloon component.

11. A computer-implemented method comprising:
determining at a first time that a first balloon in a balloon network has a first predicted failure mode that corresponds to a first set of tasks, wherein the balloon network comprises at least a first sub-fleet of balloons and a second sub-fleet of balloons, wherein the first sub-fleet is assigned a first set of one or more tasks and the second sub-fleet is assigned a second set of one or more tasks;
based on determining that the first balloon has the first predicted failure mode that corresponds to the first set of tasks, assigning the first balloon to the first sub-fleet of balloons;
determining at a later second time that the first balloon has a second predicted failure mode that corresponds to the second set of tasks, wherein the second predicted failure mode comprises a different type of predicted balloon failure than the first predicted failure mode;
determining that the second predicted failure mode is more likely to occur earlier than the first predicted failure mode; and
in response to determining that the second predicted failure mode is more likely to occur earlier than the first predicted failure mode, reassigning the first balloon from the first sub-fleet of balloons to the second sub-fleet of balloons.

12. The method of claim 11, further comprising determining a first set of constraints and second set of constraints, wherein the first sub-fleet of balloons operates according to the first set of constraints; and wherein the second sub-fleet of balloons operates according to the second set of constraints.

13. The method of claim 11, wherein a predicted failure mode of a balloon comprises a probability distribution of expected failure of the balloon over time.

14. The method of claim 11, wherein the first balloon is reassigned from the first sub-fleet of balloons to the second sub-fleet of balloons after an initial time period during which the first balloon is exposed to one or more stress tests.

15. The method of claim 11, wherein one of the sub-fleets of balloons is assigned to communicate with one or more ground-based stations.

16. The method of claim 11, wherein one of the sub-fleets of balloons is assigned to serve as relay balloons between other balloons within the network.

17. The method of claim 11, further comprising:
determining at the first time that the first balloon has the first predicted failure mode based on sensor data from one or more sensors on the first balloon; and
determining at the later second time that the first balloon has the second predicted failure mode based on additional sensor data from the one or more sensors on the first balloon.

18. The method of claim 11, further comprising:
determining at the later second time that the first balloon has the second predicted failure mode based on one or more past failures of one or more other balloons that performed at least some of the first set of one or more tasks assigned to the first sub-fleet of balloons.

19. A system comprising:
a plurality of sub-fleets of balloons, wherein each sub-fleet of balloons is assigned a corresponding set of one or more tasks within a balloon network; and
a control system configured to:
determine that a first balloon initially has a first predicted failure mode that corresponds to a first set of tasks;
based on determining that the first balloon has a first predicted failure mode that corresponds to the first set of tasks, assign the first balloon to a first sub-fleet of balloons that is assigned the first set of tasks within the balloon network;
periodically determine that the first balloon has a different predicted failure mode that corresponds to a set of tasks assigned to a different sub-fleet of balloons within the balloon network;
determine that the different predicted failure mode is more likely to occur earlier than any other previously determined failure mode; and
in response to determining that the different predicted failure mode is more likely to occur earlier than any other previously determined failure mode, reassign the first balloon to the different sub-fleet of balloons.

20. The system of claim 19, wherein the control system is further configured to:
periodically determine that a certain sub-fleet of balloons has an inadequate number of balloons; and
reassign one or more balloons to the certain sub-fleet of balloons.

21. The system of claim 19, wherein a particular set of tasks has a corresponding priority level; and
wherein at least one balloon is reassigned based on one or more of the priority levels.

22. The system of claim 19, wherein each sub-fleet of balloons is operating within the balloon network according to a particular set of constraints.

23. The system of claim 19, wherein at least one balloon is reassigned after an initial time period during which the at least one balloon is exposed to one or more stress tests.

24. A non-transitory computer readable storage medium having stored therein instructions, that when executed by a computing device, cause the computing device to perform functions comprising:
determining at a first time that a first balloon in a balloon network has a first predicted failure mode that corresponds to a first set of tasks, wherein the balloon network comprises at least a first sub-fleet of balloons and a second sub-fleet of balloons, wherein the first sub-fleet is assigned a first set of one or more tasks and the second sub-fleet is assigned a second set of one or more tasks;
based on determining that the first balloon has the first predicted failure mode that corresponds to the first set of tasks, assigning the first balloon to the first sub-fleet of balloons;
determining at a later second time that the first balloon has a second predicted failure mode that corresponds to the second set of tasks, wherein the second predicted failure mode comprises a different type of predicted balloon failure than the first predicted failure mode;
determining that the second predicted failure mode is more likely to occur earlier than the first predicted failure mode; and
in response to determining that the second predicted failure mode is more likely to occur earlier than the first predicted failure mode, reassigning the first balloon from the first sub-fleet of balloons to the second sub-fleet of balloons.

25. The non-transitory computer readable storage medium of claim 24, wherein a predicted failure mode of a balloon comprises a probability distribution of expected failure of the balloon over time.

26. The non-transitory computer readable storage medium of claim 24, wherein the first balloon is reassigned from the first sub-fleet of balloons to the second sub-fleet of balloons after an initial time period during which the first balloon is exposed to one or more stress tests.

* * * * *